United States Patent [19]

Calhoun et al.

[11] Patent Number: 5,585,178
[45] Date of Patent: Dec. 17, 1996

[54] COMPOSITE ADHESIVE TAPE

[75] Inventors: Clyde D. Calhoun, Stillwater; David C. Koskenmaki, St. Paul, both of Minn.

[73] Assignee: Minnesota Mining & Manufacturing Company, St. Paul, Minn.

[21] Appl. No.: 815,173

[22] Filed: Dec. 31, 1991

[51] Int. Cl.⁶ .................................................. B32B 7/12
[52] U.S. Cl. ................ 428/343; 428/317.5; 428/198
[58] Field of Search ............................ 428/343, 355, 428/354, 317.5, 195, 212, 198

[56] References Cited

U.S. PATENT DOCUMENTS

| | | | |
|---|---|---|---|
| 4,415,615 | 11/1983 | Esmay et al. | 428/317.5 X |
| 4,555,284 | 11/1985 | Quella et al. | 428/317.5 X |
| 4,726,982 | 2/1988 | Traynor et al. | 428/317.7 X |
| 4,818,610 | 4/1989 | Zimmerman et al. | 428/355 X |
| 4,894,277 | 1/1990 | Akasaki | 428/317.5 X |
| 4,908,273 | 3/1990 | Urech et al. | 428/355 X |
| 5,141,790 | 8/1992 | Calhoun et al. | 428/343 |
| 5,147,698 | 9/1992 | Cole | 428/317.5 X |

FOREIGN PATENT DOCUMENTS 3-14888  1/1991  Japan .................................. C09J 7/04

OTHER PUBLICATIONS

*Research Disclosure*, Aug. 1991, No. 328, p. 612, Item #32853.

*Primary Examiner*—Daniel Zirker
*Attorney, Agent, or Firm*—Gary L. Griswold; Walter N. Kirn; Gregory A. Evearitt

[57] ABSTRACT

The present invention provides adhesive articles that include more than one adhesive, or if one adhesive is used, include more than one adhesive portion, where, in each portion, the extent of cure of the adhesive is varied in a predetermined manner so that each adhesive portion behaves as if it were two or more different adhesives. The adhesive articles of the present invention are typically provided as adhesive tapes, often in the form of a tape having a longitudinal dimension (down-web dimension) that far exceeds its width (cross-web dimension).

6 Claims, 3 Drawing Sheets

FIG. 7

COMPOSITE ADHESIVE TAPE

FIELD OF INVENTION

This invention relates to adhesive articles made from two or more adhesives, where each adhesive has distinct mechanical and/or physical properties, and particularly to adhesive tapes and transfer tapes.

BACKGROUND OF THE INVENTION

Pressure-sensitive adhesive (PSA) tape has been widely used throughout the world for a variety of masking, holding, binding, protecting, sealing, marking, and other purposes. In one form, such a tape consists of a sheet-like carrier web having a coating of a normally tacky and pressure-sensitive adhesive layer. When the adhesive layer is releasable from the carrier web, the tape is often referred to as a transfer tape; such tapes are used to adhesively join two substrates. In addition to pressure-sensitive tapes, there are a variety of heat tackifying and heat hardenable tapes. Such tapes may be used, for example, in structural applications. Structural adhesive tapes include heat hardenable epoxy films that require refrigeration to extend shelf life.

Typically, an adhesive tape is designed for a broad, general use, or it is designed for a specific application. In either case, the selection of the adhesive is important. In a PSA tape, the adhesive is designed to provide bonding to a variety of substrates in a short length of time. This property of the adhesive is referred to as tack. An adhesive should also stay bonded and support a load over an extended time period. This property of the adhesive relates to its shear creep resistance. In adhesive tapes, it is also desired that the adhesive bond the tape backing to the substrate, or bond two substrates together, in the case of a transfer tape. The strength requirements of the adhesive bond varies with the application.

In general terms, pressure-sensitive adhesives consist of an elastic component modified through the addition of a viscous or plastic component. The initial bond is a function of pressure, hence the name "pressure-sensitive." To some extent, the initial bond or tack relates to wetting of the substrate by the adhesive. Good tack requires that the adhesive have considerable plastic deformation to relieve the stress in the adhesive caused by making it conform to the surface of the substrate. However, this same viscous or plastic behavior allows the adhesive to flow at intermediate stress levels over an extended time period (shear creep). Typically, adding more of the plastic component will increase tack and peel force, but will reduce shear creep resistance. Therefore, adhesive formulators are forced to make compromises in developing a PSA formulation for a particular application. See U.S. Pat. No. 4,260,659, Col. 1, lines 15–30, for a discussion of the difficulty in obtaining both good conformability and good shear properties in the same tape. In addition, variations in temperature and/or strain rate shift the viscoelastic behavior of the adhesive, and further complicate the ability to provide desired levels of tack, peel force, and shear creep resistance.

The peel force for PSA tapes often increases during the first day after the bond is made, but tends to level off after two days, with little further change thereafter. The rate of this increase in peel force is not the same for all adhesives. Increases in peel force may be related to the degree of wetting of the substrate by the adhesive. It may be expected that other factors being equal (such as surface energies) that adhesives having a high ratio of viscous to elastic deformation would wet a surface more easily. However, adhesives that have a large viscous component to their deformation (as compared to the elastic component) have less shear creep resistance, as well as less heat resistance. Heat resistance may be evaluated in terms of the temperature at which the stability of a bond is lost, and the bond fails.

Most heat tackifying tapes have little or no tack under ambient conditions, and therefore do not provide the desirable characteristics of a PSA, such as ease of use, and the ability to stay where placed (positioning convenience). Similarly, most heat hardenable or thermoset adhesive tapes and transfer tapes lack the positioning convenience of a PSA, and even when they do exhibit some room temperature tack, it is often necessary to heat the adhesives in these tapes to develop full strength. Prior to hardening or thermosetting, such adhesives may behave as a high viscosity fluid and flow, even under low stresses. Another consideration in formulating an adhesive tape is the variation in the resistance of the adhesive to solvents.

In an attempt to provide an adhesive tape with improved properties, some adhesive tape or tape-like products have been made with two adhesives. In one approach, layers of different adhesives have been coated on a carrier web. See, for example, U.S. Pat. No. 997,125 (Gleason), which shows a fabric coated with two continuous layers of heat tackifying adhesives, the outer layer having a lower melting point than the inner layer; U.S. Pat. No. 3,811,438 (Economou), and U.S. Pat. No. 3,885,559 (Economou) that teach coating two layers of PSA on a backing (one as stripes on an uninterrupted layer of the other) wherein the adhesiveness of the two adhesives differ; U.S. Pat. No. 4,112,177 (Salditt et al.) that teaches a porous backing with two or more layers of adhesive wherein the entire construction is porous; U.S. Pat. No. 4,260,659 (Gobran), U.S. Pat. No. 4,374,884 (Winslow), and U.S. Pat. No. 4,543,139 (Freedman et al.) that teach tape constructions that have two or more layers of adhesives. In addition, European Patent Application No. 0429269A1 (Calhoun et al.) discloses the use of PSA microspheres on the surface of an uninterrupted adhesive layer.

A second general approach to using more than one adhesive in a tape construction has been to coat a mixture of two adhesives. U.S. Pat. No. 3,326,741 (Olson) and U.S. Pat. No. 3,753,755 (Olson) teach mixing a PSA with a thermoset; and U.S. Pat. No. 4,049,483 (Loder et al.) teaches dispersing microspheres of PSA in a heat tackifying hot melt adhesive.

When one adhesive is coated on another where both are uniformly uninterrupted continuous layers, each adhesive is able to deform and flow as determined by the viscoelastic properties of each individual adhesive. Control of the composite properties of the tape is limited to variations in thickness of each adhesive layer, with no ability to continuously vary the area of coverage for each adhesive. When two or more immiscible adhesives are mixed, control of the composite adhesive properties of the adhesive tape is also limited to the specific manner of separation of the component adhesives.

Therefore, there is a need for a composite adhesive tape that provides better control over the physical properties provided by the respective adhesives. There is also a need for nontacky heat tackifying adhesive films that can be positioned by the use of a predetermined amount of PSA wherein the PSA is provided only on the surface of the otherwise nontacky heat tackifying adhesive film, and wherein the PSA is in a predetermined pattern. There is a need for a PSA tape or transfer tape that uses the viscoelastic properties of two or more adhesives, with the amounts and position of each adhesive predetermined, and each adhesive continuous through the thickness of the adhesive composite. There is also a need for an adhesive transfer tape wherein after transfer of the adhesive layer to an object to be bonded, the adhesive permits PSA positioning of the object on a vertical surface and the adhesive generates a structural bond during a subsequent thermal cycle without significant movement of the object.

There is a further need for a method for manufacturing composite adhesive tapes and transfer tapes that permits control over the amount and position of each adhesive.

SUMMARY OF THE INVENTION

The present invention provides adhesive articles that include more than one adhesive, or if one adhesive is used, include more than one adhesive portion, where, in each portion, the extent of cure of the adhesive is varied in a predetermined manner so that each adhesive portion behaves as if it were two or more different adhesives. The adhesive articles of the present invention are typically provided as adhesive tapes, often in the form of a tape having a longitudinal dimension (down-web dimension) that far exceeds its width (cross-web dimension). However, while the remainder of the description refers specifically to adhesive tapes, the invention relates to adhesive articles generally.

The present invention provides tapes that combine two or more different adhesives so as to achieve performance not attainable from any one of the adhesives when used alone. For example, one of the adhesives may have repositionable behavior or high initial tack to provide a bond while a second adhesive builds bond strength during aging.

The present invention provides several constructions of adhesive tapes. The first embodiment of an adhesive tape has an adhesive layer that has a first and second planar surface, the layer comprising a first adhesive and a second adhesive. The first and second adhesives each have different viscoelastic properties. Both the first and second adhesives are continuous through the thickness between the first and second planar surfaces. The first adhesive is laterally continuous, while the second adhesive is laterally non-continuous. The first and second adhesives may be, for example, pressure-sensitive adhesives, hot-tackifying adhesives, thermoset adhesives, or combinations thereof. It is preferred that adhesives are provided in a predetermined, repeatable pattern. "Planar surface," as used herein, does not necessarily mean that the surface is smooth, but refers to a broad laterally extending face typically found in an adhesive tape.

Another adhesive tape of the present invention includes an adhesive layer that has a first and second planar surface, including a first adhesive and a second adhesive. The first and second adhesives each have different viscoelastic properties. The first and second adhesives are both continuous in all directions. Preferably the general structure of each adhesive is predetermined, as distinguished from a random structure that could occur if two adhesives are mixed before coating. Examples of configurations for the first and second adhesives include a first adhesive having an intertwined serpentine structure, with a second adhesive filling the voids in such a structure. Both adhesives are preferably present through the thickness of the layer, as well as down-web and cross-web.

A further adhesive tape of the present invention is an adhesive transfer tape that comprises an embossed carrier web including a first planar surface and a second planar surface, and having a plurality of recesses formed at the first planar surface. An adhesive layer is provided that has a bonding surface and an adhesive member surface. The adhesive member surface has a plurality of adhesive members adhered thereto. It is preferred that the recesses are provided in a precise, predetermined pattern, and may be a plurality of discrete shapes. The adhesive members have the shape of the recesses, and when the tape is rolled into a roll the members are contained within the recesses. The first planar surface, including the recesses, of the embossed carrier web is preferably a release surface so that the adhesive members and the adhesive layer are removably adhered thereto.

An alternative construction can be achieved by adjusting relative surface characteristics. When the tape is unrolled the bonding surface of the adhesive layer can be adhered to the second planar surface of the embossed carrier web with the adhesive members exposed and extending from the adhesive member surface of the adhesive layer.

Another adhesive tape of the present invention comprises a) a differential release carrier web having first and second planar surfaces, the surfaces having a plurality of recesses formed therein; b) first adhesive members are provided in the recesses in the first planar surface of the carrier web; c) a continuous adhesive layer having a first and second surface, the first surface adhered to the first planar surface and the first adhesive members; and d) second adhesive members provided on the second surface of the continuous adhesive layer, the second adhesive members adapted to fit into the recesses in the second planar surface of the carrier web when the adhesive transfer tape is rolled about itself into a roll. Such an adhesive tape is typically provided in a roll that when unrolled provides the described construction.

The present invention also provides an adhesive tape that includes an embossed carrier web having a first and second planar surface, the first planar surface having a plurality of discrete recesses formed therein. Each recess has a first adhesive member provided therein. A second adhesive layer is provided on the first planar surface, and the first adhesive members. The adhesive layer has perforations that correspond to the recesses, such that the adhesive members in the recesses are exposed.

Another adhesive tape of the present invention comprises: a) a continuous first adhesive layer having a first and second planar surface; second adhesive members that are discrete adhesive shapes extending between, and in some cases above, the first and second planar surfaces; first and second carrier webs, provided on the first and second planar surfaces, respectively. The carrier webs have a plurality of perforations positioned over the second adhesive members to expose the second adhesive members. A similar embodiment further provides third adhesive members extending between the first and second planar surfaces.

The present invention also provides a method of making a composite adhesive tape including an adhesive layer having a first adhesive and a second adhesive, both continuous through the thickness of the layer, the method comprising the steps of: a) providing an embossed substrate having a planar surface with a plurality of recesses therein; b) coating the first adhesive into the recesses of the embossed substrate and hardening the first adhesive; c) transferring the first adhesive to a carrier web; d) coating the second adhesive in the area on the carrier web void of the first adhesive.

The present invention also provides a method of making a composite adhesive tape including the steps of: a) coating an adhesive layer onto a first carrier web; b) laminating a second carrier web to the side of the adhesive layer opposite the first carrier web; c) perforating the first and second carrier webs and the adhesive layer; d) coating a second adhesive into the perforations. An alternative method further includes providing blind holes that extend through one of the carrier webs and the adhesive layer. The second adhesive is then coated from the side opposite the blind holes, and a third adhesive is coated into the blind holes. A metal layer may be provided at one of the carrier webs and the blind holes laser drilled through from the side of the tape opposite the metal layer, with the holes stopping at the metal layer.

"Precise," as used herein, refers to the placement of individual recesses and adhesive members in a predetermined pattern. The lateral spacing between individual recesses or members that are spaced precisely is not necessarily the same, but the recesses or members are spaced as desired for the particular application.

DETAILED DESCRIPTION OF THE INVENTION

The adhesive tapes of the present invention each include more than one adhesive, with each adhesive having a direct influence on the physical properties of the composite adhesive tape. Each adhesive in the adhesive tapes of the present invention is provided in a configuration relative to the other adhesive or adhesives so as to provide a desired contribution to the desired total properties of the composite adhesive tape.

Figure 1:
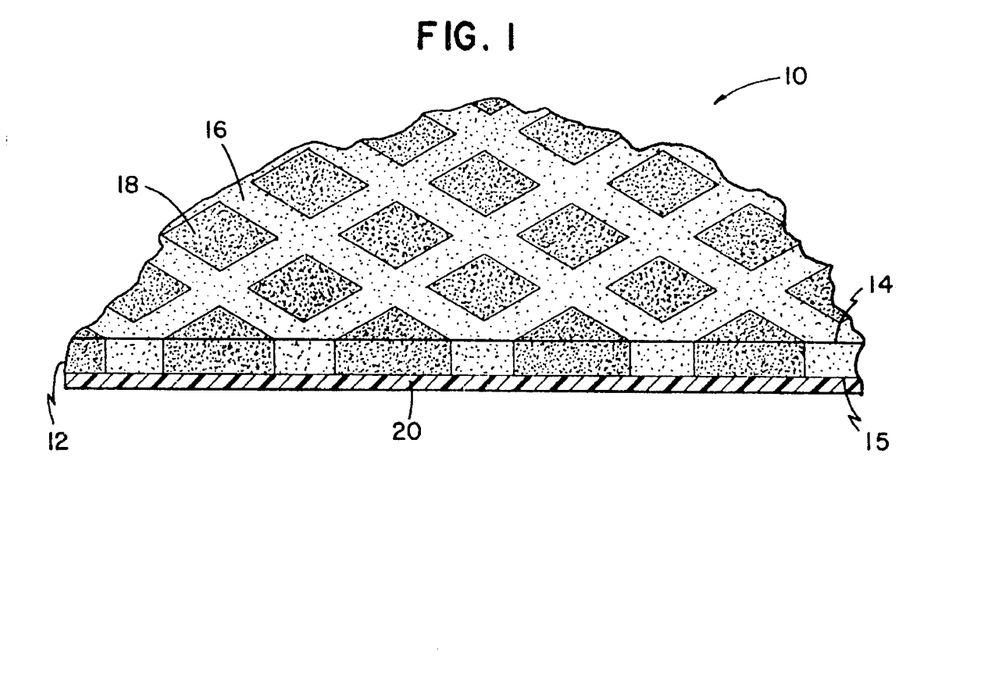
FIG. 1 is a partial schematic plan view and cross-section of a composite adhesive tape of the present invention.

Turning to the Figures, in FIG. 1, an adhesive tape generally designated 10 is shown. The tape 10 includes an adhesive layer 12 having a first planar surface 14 and a second planar surface 15. The adhesive layer 12 includes a first adhesive 16 and a second adhesive 18. A carrier web 20 is adhered to the second planar surface 15 of the adhesive layer 12. The second adhesive 18 exists as a discontinuous phase, made up of discrete adhesive members provided in a continuous first adhesive 16; both first and second adhesives 16 and 18 extend throughout the thickness of the adhesive layer 12, between the first planar surface 14 and the second planar surface 15. Second adhesive 18 may be of any cross-sectional shape that is desired, and the relative amount of each adhesive may be varied as desired. Also, an adhesive tape may be provided with first and second adhesives that vary locally as to which is the continuous and/or major phase. Adhesives 16 and 18 can be any combination of adhesives, such as pressure-sensitive adhesive (PSA), hot-tackifying adhesive, or thermosetting adhesive. Carrier web 20 can be securely bonded to adhesives 16 and 18 or it may be coated with a release coating to provide a releasable bond to provide an adhesive transfer tape.

The adhesive tapes of the type shown in FIG. 1 have one laterally continuous adhesive (first adhesive 16) and one laterally non-continuous adhesive (second adhesive 18). Laterally continuous, as used herein, means that the adhesive has continuity in at least one direction in the plane of the adhesive layer, for example, a network that extends down-web and/or cross-web. Continuous, as used herein, does not necessarily refer to an uninterrupted, uniform adhesive layer, as is evident from the pattern of first adhesive 16 in FIG. 1. The combination of first adhesive 16 and second adhesive 18 forms the adhesive layer 12 which is uninterrupted and uniform in thickness. Preferably, one of the adhesives is laterally continuous in the down-web and the cross-web directions, as is first adhesive layer 16 in FIG. 1.

Figure 2:
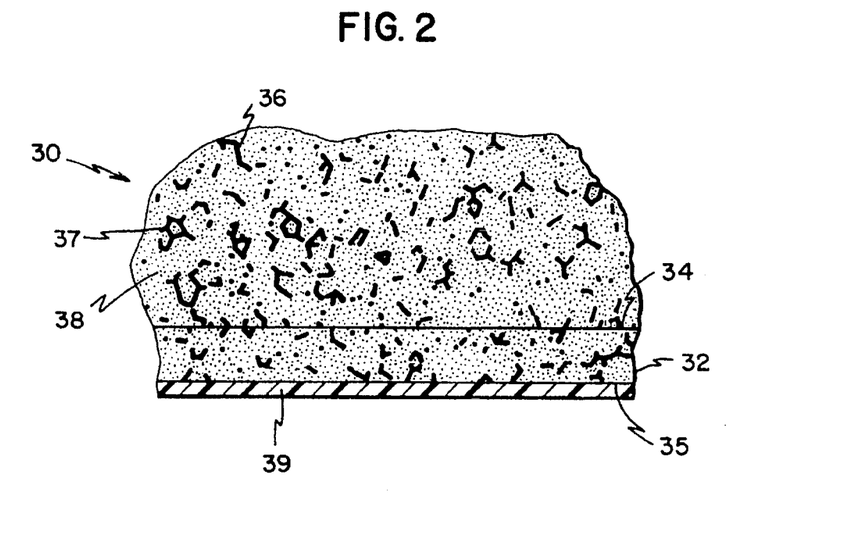
FIG. 2 is a partial schematic plan view and cross-section of a composite adhesive tape of the present invention.

Referring to FIG. 2, an adhesive tape generally designated 30 is shown. The adhesive tape 30 includes an adhesive layer 32 having a first planar surface 34 and a second planar surface 35. The adhesive layer 32 includes a first adhesive 36 and a second adhesive 38. Both adhesives 36 and 38 are continuous in all directions. Continuous includes entanglement of adhesive strands provided in a non-woven construction. The first adhesive 36, for example, a hot tackifying adhesive, provided, for example, as an open pored skeleton structure, has been filled with the second adhesive 38. The first adhesive 36 provided in a skeleton structure can consist of, for example, an open celled foam or a woven or non-woven mat.

In FIG. 2, the first planar surface 34 is a cross-section through the skeleton structure of first adhesive 36. The structure of first adhesive 36 is a three dimensional mat made up of individual cells 37. A wide variety of skeleton-like structures may be used. Curly or intertwined serpentine strands, forming an adhesive mat may be formed, for example, by extruding a liquid adhesive through a slot die and quenching the adhesive in a manner that forms the desired mat or skeleton structure. The second adhesive 38 is continuous as it fills the voids in the skeleton structure of the first adhesive 36. Alternatively, first and second adhesive mats could be intertwined and filled with a third adhesive. The relative amounts of adhesives 36 and 38 may be varied. Any of the adhesives may have filler particles for a variety of purposes, e.g., conductive particles for conductivity. The adhesive tape 30 also includes a carrier web 39 (functioning as either a backing or release liner) adhered to the second planar surface 35.

Figure 3:
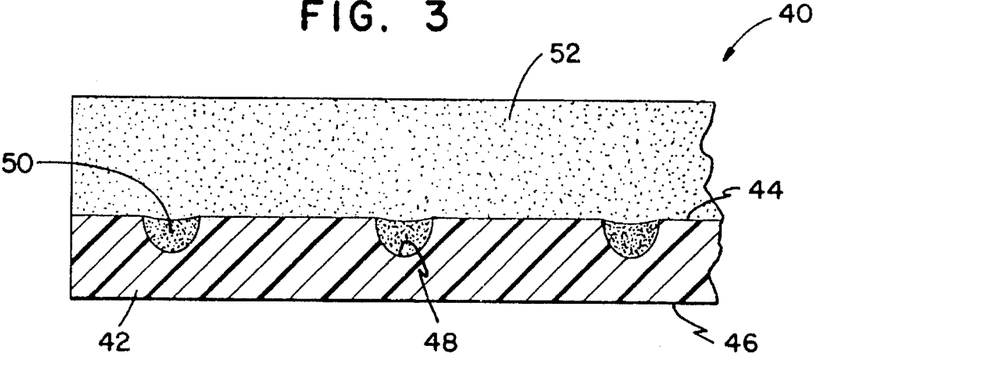
FIG. 3 is a schematic cross-section of a composite adhesive transfer tape of the present invention.

Referring to FIG. 3, an adhesive tape generally designated 40 is shown. The tape 40 includes an embossed carrier web 42 having a first planar surface 44 and a second planar surface 46. The carrier web 42 has a plurality of recesses 48 formed at the first planar surface 44. The recesses 48 have first adhesive members 50 provided therein. Adhesive layer 52, having bonding surface 53 and adhesive member surface 54, is provided over the first planar surface 44 and first adhesive members 50.

The tape can be made by embossing a carrier web and then coating first adhesive members 50 into the recesses, followed by coating with second adhesive 52. The tape 40 can be rolled about itself and provided as a roll. The first planar surface 44 may be a release surface so that the first adhesive members 50 and the adhesive layer 52 are removably adhered thereto. Alternatively, when a roll of the tape 40 is unrolled the bonding surface 53 adheres to the second planar surface 46 and the adhesive members 50 are exposed and extend from the adhesive layer 52.

Figure 4:
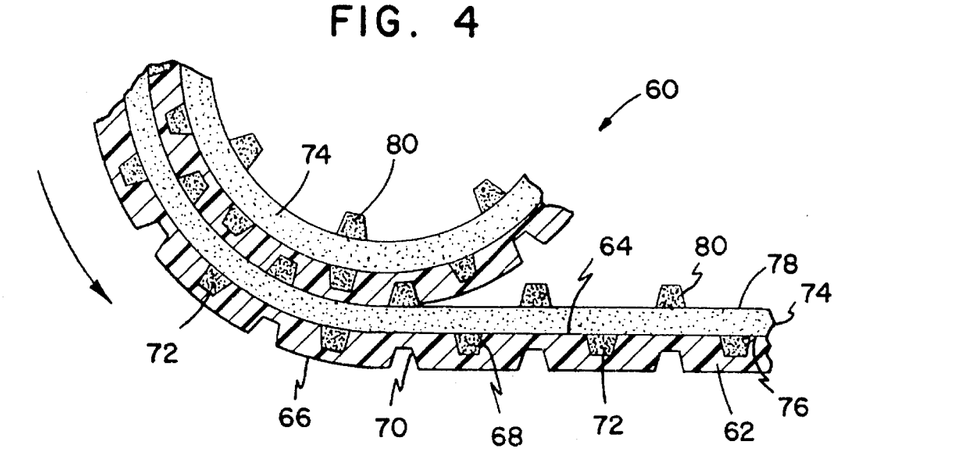
FIG. 4 is a schematic cross-section of a composite adhesive transfer tape of the present invention.

In FIG. 4, a composite adhesive transfer tape 60 is shown in a fragmentary view as a roll of tape that is partially unwrapped. The tape 60 includes an embossed carrier web 62 that has a first planar surface 64 and a second planar surface 66. The embossed carrier web has a plurality of recesses 68 at the first planar surface 64, and plurality of recesses 70 at the second planar surface 66. First adhesive members 72 are provided in the recesses 68 at the first planar surface 64. An adhesive layer 74 is provided over the first planar surface 64 and first adhesive members 72. The adhesive layer 74 includes a first adhesive surface 76 and a second adhesive surface 78. Second adhesive members 80 are provided on the second adhesive surface 78 of the adhesive layer 74. The second adhesive members 80 are adapted to fit into the recesses 70 in the second planar surface 66 of the embossed carrier web 62 so that the tape is able to be provided as a roll.

An adhesive tape having the construction shown in FIG. 4 would typically be made with the second adhesive members 80 provided in the recesses 70 at the second planar surface 66 of the embossed carrier web 62. When a tape made in this manner is rolled into a roll, a bond is formed between the second adhesive members 80 and the second adhesive surface 78 of the adhesive layer 74 that is greater than the bond between the second adhesive members 80 and the recesses in which they were formed (recesses 70). The second planar surface 66 of the carrier web 62, including the recesses 70, preferably have an appropriate surface that forms a bond with the second adhesive members 80 and the second adhesive surface 78 of the adhesive layer 74 that is less than the bond formed between the opposite side of the carrier web (first planar surface) and the first adhesive surface 76 of the adhesive layer 74 and the first adhesive members 72 adhered thereto. This will allow the construction described above to be easily unrolled from a roll of the composite adhesive tape in the manner shown in FIG. 4.

In use, the second adhesive members 80 normally contact the substrate first; with additional pressure the adhesive 74 contacts the substrate. After bonding to the first substrate and removing embossed carrier web 62, the first adhesive members 72 and the first adhesive surface 76 of adhesive layer 74 are exposed for bonding to a second substrate. In bonding to the second substrate, first adhesive members 72 are normally first to contact the substrate followed by first adhesive surface 76 with the application of more pressure. First and second adhesive members 72 and 80 may be the same or different adhesives; either or both may be continuous networks, islands or any combination of the two. The height of adhesive members 72 and 80 may be the same or different, although they are normally less than the thickness of adhesive layer 74 (typically about 50 μm to 500 μm), they need not be so limited. The first planar surface 64 and the second planar surface 66 will preferably have different release properties with respect to the first adhesive surface 76 and the second adhesive surface 78 and with respect to the first and second adhesive members 72 and 80. This will dictate the configuration generated when the tape is unrolled, including which of the adhesive members (72 or 80) are exposed when the tape is unrolled. The release characteristics of the surfaces can be adjusted by known methods.

Figure 5:
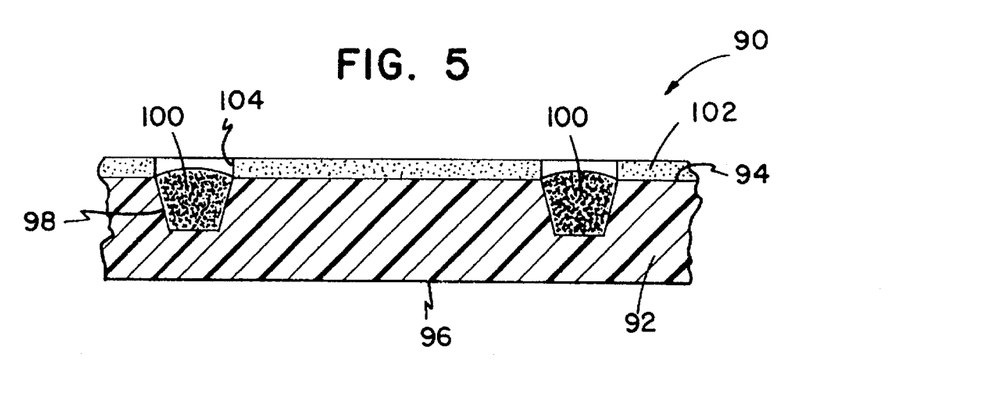
FIG. 5 is a schematic cross-section of a composite adhesive transfer tape of the present invention.

A composite adhesive tape 90 of FIG. 5 includes an embossed carrier web 92 that has a top planar surface 94 and a bottom planar surface 96. The carrier web 92 includes a plurality of recesses 98 at the top surface 94. The recesses 98 include adhesive members 100. An adhesive layer 102 is provided over the top surface 94. The adhesive layer 102 includes perforations 104 positioned over the adhesive members 100 so that the adhesive members 100 are exposed.

Embossed carrier web 92 may be embossed in any of a variety of patterns and therefore the adhesive members 100 and the adhesive layer 102 may have a wide variety of predetermined shapes and patterns. The recesses in the carrier web can be made by a number of processes, including thermal embossing, cast embossing, laser drilling, and by etching the surface of the carrier with a reactive material.

Figure 6:
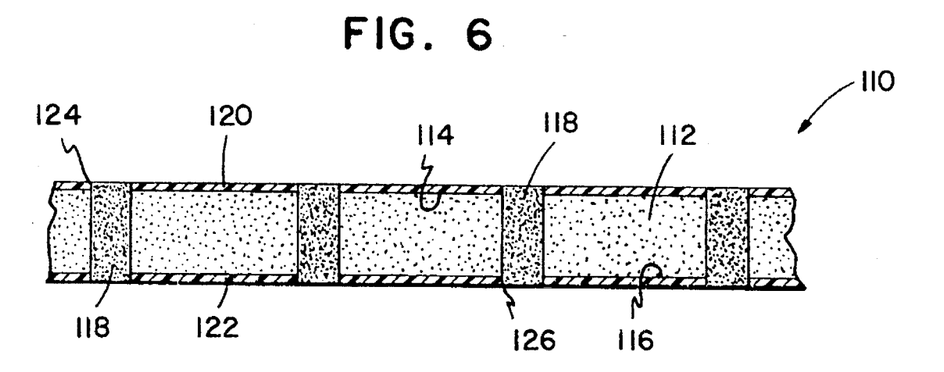
FIG. 6 is a schematic cross-section of a composite adhesive tape of the invention.

In FIG. 6, a composite adhesive tape 110 is shown, having a first adhesive layer 112 with a first planar surface 114 and a second planar surface 116. Second adhesive members 118 are provided as discrete adhesive members in the adhesive layer 112. A first carrier web 120 and a second carrier web 122 are provided on the first planar surface 114 and the second planar surface 116, respectively. The first carrier web 120 has perforations 124 and the second carrier web has perforations 126. Either adhesive layer 112 or second adhesive member 118 may be a PSA. The only restriction on adhesive selection is that of perforating and filling of the perforations. In one method of manufacture, a tape is made by coating adhesive layer 112 on carrier web 122. The first carrier web 120, typically a release film, is laminated to the first planar surface 114 of the adhesive layer 112 followed by perforating the entire construction. The second adhesive members 118 are then coated into said perforations. Carrier web 122 may alternately be a release liner to provide composite adhesive tape 110 to be used as a transfer tape.

Figure 7:
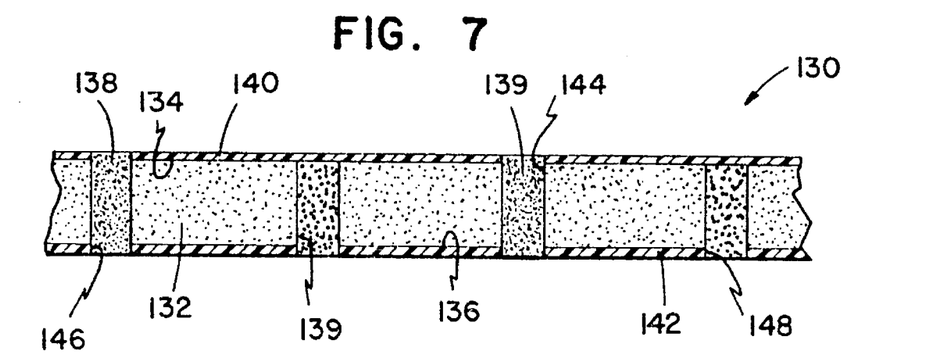
FIG. 7 is a schematic cross-section of a composite adhesive tape of the invention.

In FIG. 7, a composite adhesive tape 130 is shown, having a first adhesive layer 132 with a first planar surface 134 and a second planar surface 136. Second adhesive members 138 and third adhesive members 139 are provided as discrete adhesive members in the adhesive layer 132. The adhesive of members 138 and 139 and first adhesive layer 132 are different adhesives. A first carrier web 140 and a second carrier web 142 are provided on the first planar surface 134 and the second planar surface 136, respectively. The first carrier web 140 has perforations 144 and the second carrier web has perforations 146. The perforations 144 and 146 are positioned so that the second adhesive members 138 are exposed. The third adhesive members 139 are covered by carrier web 140 and exposed through perforations 148 in carrier web 142.

In one method of manufacture, a tape is made by coating first planar surface 134 of adhesive layer 132 onto first carrier web 140. A second carrier web 142 (typically a release film) is laminated to the second planar surface 136 of adhesive layer 132. The adhesive layer 132 and the carrier webs 140 and 142 are then processed to have perforations 144 and blind holes at perforations 148. The perforations are first filled with a second adhesive to form adhesive members 138 by coating onto carrier web 140. The blind holes are then filled with a third adhesive to form adhesive members 139. The thicknesses of carrier webs 140 and 142 may be adjusted so that adhesive members 138 may protrude above first planar surface 134 and second planar surface 136 of adhesive layer 132. Likewise, the thickness of carrier web 142 will provide an upper limit to the height to which adhesive members 139 will protrude above the second planar surface 136 of adhesive layer 132.

Method

The adhesive articles of the present invention may be made through a variety of methods of manufacture. An adhesive tape such as is shown in FIG. 1, may be made by first embossing an intermediate carrier to provide recesses. The dimensions of the recesses will determine the shape of the first adhesive that is coated and the thickness of the adhesive layer. The recessed side of the intermediate carrier web is optionally treated to provide a low release surface. The recesses in the embossed carrier web are filled with a first adhesive either by wiping an excess with a doctor blade or by laminating a cover sheet using a nip. The first adhesive is then cured and transferred to a carrier web or cover sheet. Release to the adhesive is lower from the embossed intermediate carrier web than from the carrier web such that separation of the two webs transfers the patterned adhesive to the carrier web. A second adhesive is then coated to the thickness of the first adhesive, in those regions void of said first adhesive. The method for filling these regions is similar to the method used to fill the recesses in the embossed intermediate carrier web. When coating two adhesives by this method, the less tacky adhesive is preferably coated first. This method could be used to manufacture the construction shown in FIG. 1.

In an alternate method, a first adhesive layer is sandwiched between two carrier webs (at least one of which is releasable) after which the entire construction is perforated. Perforations may be accomplished either mechanically or with a laser and may be of a wide variety of cross-sections and patterns. The perforations are filled with a second adhesive. The sequence of perforation and coating may be repeated a second and third time to provide composite adhesives with three or four adhesives. This method could be used in the manufacture of a construction such as illustrated in FIG. 6. In a variation on this method, blind holes and through holes are accomplished in the first adhesive layer and the two carrier films. Blind holes could be made by die cutting, or by providing a metal layer on the back side of one carrier film and laser drilling from the opposite side. During laser drilling, the blind holes will stop at the metal layer. A second adhesive is coated from the side of the construction having only the through perforations such that all of the through holes are filled. The opposite side of the construction is then coated with a third adhesive, which fills only the blind holes. (The blind holes pass through one carrier web and the first adhesive layer terminating at the interface between the first adhesive layer and the second carrier web). This method of manufacture could be used to make a construction such as illustrated in FIG. 7.

In another method, the construction shown in FIG. 5 could be made by filling the recesses in a silicone coated embossed carrier web with a first adhesive. This first adhesive is allowed to dry, harden or cure to a nontacky state relative to the adhesive powder coated next. Because particles adhere to silicone, the planar surface portion of the embossed film may be coated with particles of a second adhesive from a fluidized bed. Since the first adhesive is not tacky to the powder of the second adhesive, the second adhesive will tend not to overcoat the first adhesive. The second adhesive powder may be heated and caused to flow laterally to join like powder thereby forming an adhesive film. If the second adhesive does not totally cover the silicone coated raised surface portion of the embossed carrier web, which often happens after one coating step, additional powder may be applied to the remaining exposed silicone coating and again heating to reflow the adhesive. This method can be used advantageously to combine, for example, two hot-tackifying adhesives, or a hot-tackifying and a thermoset adhesive.

Additional examples of methods for making composite adhesives are to die cut a pattern and fill with a second adhesive, mix spheres of a first adhesive with a second and coat to the thickness of the spheres (this material may be optionally nipped to reduce the thickness and increase the contact area of the first adhesive with the carrier webs) and screen print patterns, including alternating stripes of two or more laterally continuous adhesives.

Carrier Webs

Any number of carrier webs may be used. When the method uses an embossed carrier web, the web may advantageously be a thermoplastic film that is either thermally embossed or cast on an engraved drum. The carrier web is preferably flexible. Polymer coated papers, oriented films, and the like are all well known and may be selected as dictated by the method used to make the composite tape. Typical thicknesses for the carrier web are 10 µm to 1000 µm, preferably 25 µm to 250 µm. Typical depths for the recesses are 10 µm to 250 µm.

An embossed carrier web used in the present invention may be embossed by any technique that provides a plurality of recesses in the carrier web. Suitable techniques for forming recesses include thermal embossing, chill casting, casting, extrusion, photoresist, thermal treating, chemical etching, and laser treating.

The carrier web can be any material that is capable of having recesses formed in a front, and/or back surface. Examples of such materials include paper, mesh materials, polymeric film, metals, glass, thermosetting resins, and thermoplastic resins. The preferred material is a thermoplastic resin. Examples of suitable thermoplastic resins include nylon, polyethylene, polyester, polypropylene, and ethylene acrylic acid. B stage thermosetting resins can also be used as they are in a thermoplastic state.

The recesses in the surface of embossed carrier webs can have any shape. For example, the lateral cross-section of the recesses can be rectangular, semicircular, circular, triangular, square, hexagonal, octagonal, or other desired shape. The recesses can be continuous or discrete, and can have any shape such as a cube, a truncated cone, a truncated pyramid, a hemisphere or other portion of a sphere, an elongated rectangle, such as an extended linear recess, a V-shaped trough, or any other shape of recess.

Adhesives

Any suitable adhesive may be used in the adhesive articles of the present invention. For example, pressure-sensitive, hot-tackifying, or thermoset adhesives may be used. Some adhesives function better in some constructions, and can be selected for the desired physical or mechanical properties, or for processing advantages. The patterns, thicknesses, and relative amounts of the adhesives may be varied as desired to achieve specific properties in the final composite tape construction. Typical thickness of the adhesive layers are 10 µm to 1000 µm, and preferably 25 µm to 250 µm.

Examples of adhesives that can be used in this invention include silicones, polyolefins, polyurethanes, polyesters, acrylics, epoxies, rubber-resin, and polyamides. Suitable pressure sensitive adhesives include solvent-coatable, hot-melt-coatable, radiation-curable (E-beam or UV curable) and water-based emulsion type adhesives that are well-known in the art. Specific examples of suitable adhesives include acrylic-based adhesives, e.g., isooctyl, acrylate/ acrylic acid copolymers and tackified acrylate copolymers; tackified rubber-based adhesives, e.g., tackified styrene-isoprene-styrene block copolymers; tackified styrene-butadiene-styrene block copolymers; nitrile rubbers, e.g., acrylonitrile-butadiene; silicone-based adhesive, e.g., polysiloxanes; and polyurethanes.

The present invention is further described by the following non-limiting examples.

EXAMPLE 1

An adhesive tape of the present invention was made as follows. A 50 μm thick one part epoxy transfer adhesive (AF-126 from 3M) was cut into two sections each 25 mm by 90 mm. A paper punch was used to punch a 0.6 cm diameter hole in one of the two sections. A small hole was drilled in one end of a 1.5 mm by 25 mm by 100 mm strip of cold rolled steel. The two sections of adhesives were placed on each side of this steel strip. The hole in the one section of AF-126 was filled with a 50 μm thick plug of pressure sensitive adhesive cut from a transfer tape (VHB 9460PC from 3M). Two 25 mm by 90 mm sections of 3.1 mm thick LUCITE (General Electric) were then bonded to either side of the steel strip. (At room temperature, AF-126 has sufficient tack to lightly bond these two materials even on the side of the steel strip not having the pressure sensitive adhesive plug). A wire was attached to the LUCITE-steel-LUCITE sandwich by means of the hole in the steel strip. The sample was then hung in an oven at 127° C. for 40 min.

After removing the sample from the oven, it was observed that the LUCITE strip on the side of the steel strip having the pressure sensitive adhesive plug had not moved whereas the LUCITE strip bonded to the steel only with the AF-126 had moved about 7 mm. During the thermal treatment, the viscosity of the AF-126 decreases such that it could not prevent movement of the LUCITE, whereas the plug of VHB 9460PC continued to have sufficient shear creep resistance to support the LUCITE. Once the AF-126 cures, it provides an adhesive bond with greater than 30 MPa shear stress at room temperature. The room temperature shear stress of VHB 9460PC is less than 1 MPa.

EXAMPLE 2

An adhesive tape of the present invention was made as follows and as per Example 1, except that 1.5 mm thick cold rolled steel was substituted for the LUCITE. The steel strips bonded with only AF-126 had about 1 cm of relative movement whereas the strips bonded with the composite adhesives of AF-126 and VHB 9460PC had no detectable relative movement.

EXAMPLE 3

An adhesive tape of the present invention and illustrative of the embodiment shown in FIG. 1, was made as follows. A 0.1 mm polyethylene film was male/female embossed (a recess is formed that exceeds the thickness of the carrier) to have about four diamond shaped recesses per cm; the depth of each recess was 0.175 mm. The short axis and all sides of the diamond were 1.9 mm; the long axis was oriented down web. The diamond shaped recesses were separated by 0.476 mm wide intersecting ridges that ran at 30 degrees to the length of the film. The recessed side of the film was coated with a silicone (polysiloxane) based release by Daubert Coated Products, Inc. of Willowbrook, Ill. The coating of this silicone release is available from Daubert Co. under the designation 164Z.

Two solventless UV curable acrylic PSA adhesives were made to provide two different sets of properties. Adhesive A consisted of 79.2% isocetylacrylate (IOA), 20% acrylic acid, 0.2% IRGACURE 651, (a photo initiator available from Ciba Geigy), 0.4% hexane diol diacrylate (HDDA), and 0.2% triazine. Adhesive B consisted of 94.8% IOA, 5% acrylic acid and 0.2% IRGACURE 651. Adhesive A was harder and less tacky than Adhesive B.

The recesses in the embossed carrier web of this example were filled with either Adhesive A or Adhesive B. The recesses in the carrier web were filled by spreading the uncured adhesive across the carrier web in excess. The embossed carrier web and a cover sheet were then laminated together by passing between a steel and 70 Shore A-2 Durometer rubber roll. The cover sheet was obtained from Toray ("Cerapeel" with BK coating one side) and consisted of 0.05 mm thick polyethylene terephthalate (PET) coated on one side with silicone release. The pressure between the nip rolls was adjusted so that little or no adhesive remained on the planar surface portion of the embossed carrier web. The assembly was then placed 5 cm from a desk lamp (Dayton 2V346E), which contained two 46 cm. long UV lamps (General Electric F15T8 BL). The time of exposure was typically 5 min. The embossed recesses prevented the cured adhesive from lateral flow under ambient conditions. The tape was then wound into a roll. When the adhesive tape was unwound and the cover sheet was separated from the embossed carrier web, the adhesive existed as diamond shaped elements on the cover sheet.

The region between the diamond shaped adhesive elements were then coated with either Adhesive A or Adhesive B. The procedure was similar to the first coating operation except that the cover sheet was a 50 μm polyester film coated with 164Z silicone release sheet by Daubert Co. All four adhesive combinations were made, i.e., AA, AB, BA, and BB. Samples with adhesive conditions AA and BB were made by this technique in an attempt to improve comparative data.

Square sections (2.5 cm) of the four adhesive combinations of this example were used to bond 3.8 cm by 7.5 cm by 1.5 mm aluminum panels. Bonding was such that the panels formed lapped joins with uniform overlap of the adhesive sections. After aging for two hours at 23° C. (flat and without load), the samples were hung vertically in an oven by means of wire hooks through holes in the aluminum panels. A 1 kg brass weight was hung from the lower end of each aluminum/adhesive/aluminum test piece. A multichannel electrical timer was connected to the weight of each sample to record the time of failure.

After five minutes in the oven (a recirculating hot air type), the oven was turned on and the temperature set at 40° C. Every 15 minutes the temperature was increased 15 degrees. An unloaded test piece with a thermocouple embedded in the adhesive was used to monitor the approximate temperature of the samples. The oven temperature increased to the new thermostat settings in 3–5 minutes. The test pieces lagged by about 5 minutes and stabilized 1–3 degrees below the air temperature in the oven.

The time to failure, starting from the moment the oven was turned on, and the approximate temperature at the time of failure for each of the four samples are given in Table 1.

TABLE 1

| Segments | Lines | Time (min) | Temperature (°C.) |
|---|---|---|---|
| A | A | 5.2 | <40 |
| A | B | 86.8 | 130 |
| B | A | 166.1 | 190 |
| B | B | 23.2 | 55 |

The data in Table 1 show: 1) the combination of Adhesives A and B has better lap shear than either Adhesive A or B when used alone, and 2) the two composite tapes of this example had different lap shear, i.e., the best data occurred when discontinuous segments of Adhesive B were separated by continuous cross hatched lines of Adhesive A.

A similar test was carried out with adhesive combination AA except that the bonded sample was heated to 110° C. for 30 minutes, cooled to 23° C. and then tested as above. When tested by this method, adhesive combination AA had not failed when the test was stopped at 225° C. due to charring of the adhesive.

The same four adhesive constructions of Table 1 were cooled to 5° C. before testing for low temperature bond formation. Large heat sinks at 5° C. were used to maintain the temperature during bonding. The samples were placed in contact with the heat sink and handled with forceps to minimize heating. Adhesive combination AA did not bond even after one minute and considerable pressure. The remaining three samples bonded well enough to permit removal of the second liner after less than 30 seconds of light pressure to assure contact.

What is claimed is:

1. An adhesive tape including an adhesive layer having first and second planar surfaces coated on a carrier web, said adhesive layer comprising a first adhesive and a second adhesive, said first and second adhesives having different viscoelastic properties from the other, both said first and second adhesives being continuous through the thickness of the adhesive layer, and wherein said first adhesive is laterally continuous and said second adhesive is laterally non-continuous.

2. The adhesive tape of claim 1 wherein said first and second adhesives are pressure-sensitive adhesives.

3. The adhesive tape of claim 1 wherein one of said adhesives is pressure-sensitive and the other adhesive is hot-tackifying.

4. The adhesive tape of claim 1 wherein at least one of said adhesives is a thermoset adhesive.

5. The adhesive tape of claim 1 wherein the second adhesive comprises more than 50% by volume of the adhesive layer.

6. The adhesive tape of claim 1 wherein the second adhesive is provided in a precise pattern at the first and second planar surfaces of the adhesive layer.

* * * * *